(12) United States Patent
Tanigawa et al.

(10) Patent No.: US 7,031,982 B2
(45) Date of Patent: Apr. 18, 2006

(54) PUBLICATION CONFIRMING METHOD, PUBLICATION INFORMATION ACQUISITION APPARATUS, PUBLICATION INFORMATION PROVIDING APPARATUS AND DATABASE

(75) Inventors: Tetsuroh Tanigawa, Yokohama (JP); Mikuni Murata, Kawasaki (JP); Shunzoh Mogi, Yokohama (JP); Tohru Shimizu, Funabashi (JP)

(73) Assignee: Ricoh Company, Ltd., Tokyo (JP)

( * ) Notice: Subject to any disclaimer, the term of this patent is extended or adjusted under 35 U.S.C. 154(b) by 473 days.

(21) Appl. No.: 10/144,798

(22) Filed: May 15, 2002

(65) Prior Publication Data

US 2002/0174271 A1 Nov. 21, 2002

(30) Foreign Application Priority Data

May 16, 2001 (JP) .............................. 2001-146759

(51) Int. Cl.
G06F 17/30 (2006.01)
G06F 7/00 (2006.01)

(52) U.S. Cl. ........................ 707/104.1; 707/103; 707/3
(58) Field of Classification Search ................ 382/224; 707/104.1, 3, 104, 103
See application file for complete search history.

(56) References Cited

U.S. PATENT DOCUMENTS

| 5,867,597 | A | 2/1999 | Peairs et al. | |
| 6,665,442 | B1 * | 12/2003 | Sekiguchi et al. | 382/224 |
| 6,694,331 | B1 * | 2/2004 | Lee | 707/104.1 |

FOREIGN PATENT DOCUMENTS

| EP | 0465818 A2 | 1/1992 |
| EP | 0 435 254 | 3/1995 |
| JP | 2729356 | 12/1997 |
| JP | 10-289237 | 10/1998 |
| JP | 2000-20538 | 1/2000 |
| JP | 2000-30145 | 1/2000 |
| JP | 2001-76007 | 3/2001 |

OTHER PUBLICATIONS

Cheung et al. "A Content-Based Search Engine on Medical Images for Telemedicine" IEEE 1997, pp. 569-172.
European Action dated Jul. 15, 2005, issued in counterpart foreign application.

* cited by examiner

Primary Examiner—Mohammad Ali
Assistant Examiner—Thanh-Ha T. Dang
(74) Attorney, Agent, or Firm—Morrison & Foerster LLP

(57) ABSTRACT

A publication information acquisition apparatus used by a user of a service converts information extracted from a newspaper into electronic information and transmits the electronic information to a publication information providing apparatus. The publication information providing apparatus decodes the electronic information, acquires key information for searching for characters and/or an image from the decoded electronic information, and searches newspaper information in a database based on the key information. The publication information providing apparatus acquires the name of a newspaper and the date of issue thereof as confirmation information and transmits the confirmation information to the publication information acquisition apparatus. It is therefore possible to easily know from which newspaper the extraction is acquired and when the newspaper was issued.

4 Claims, 6 Drawing Sheets

FIG. 4

| DATA OF ISSUE | NAME OF NEWSPAPER | TEXT ON NEWSPAPER |
|---|---|---|
| | | |

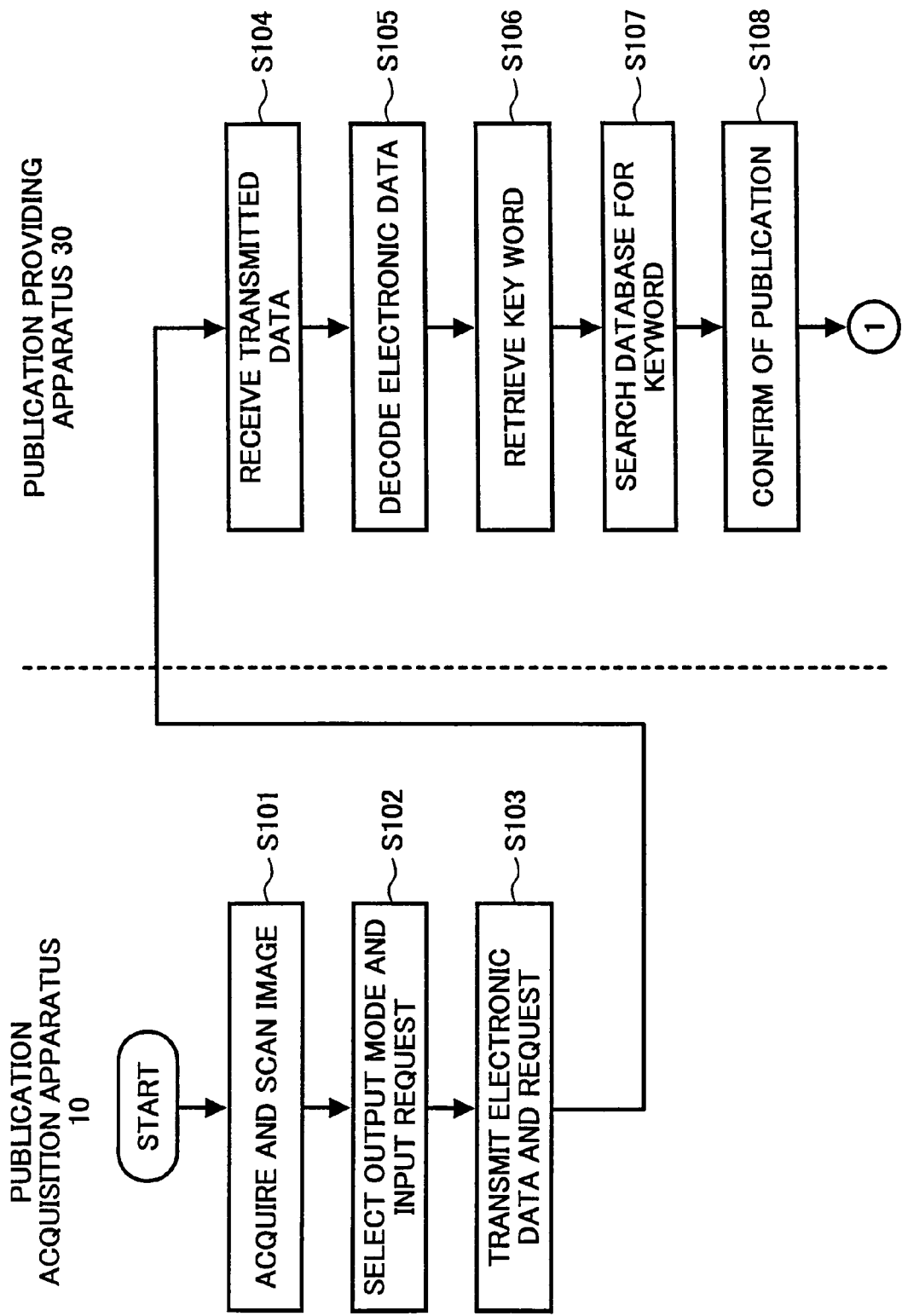

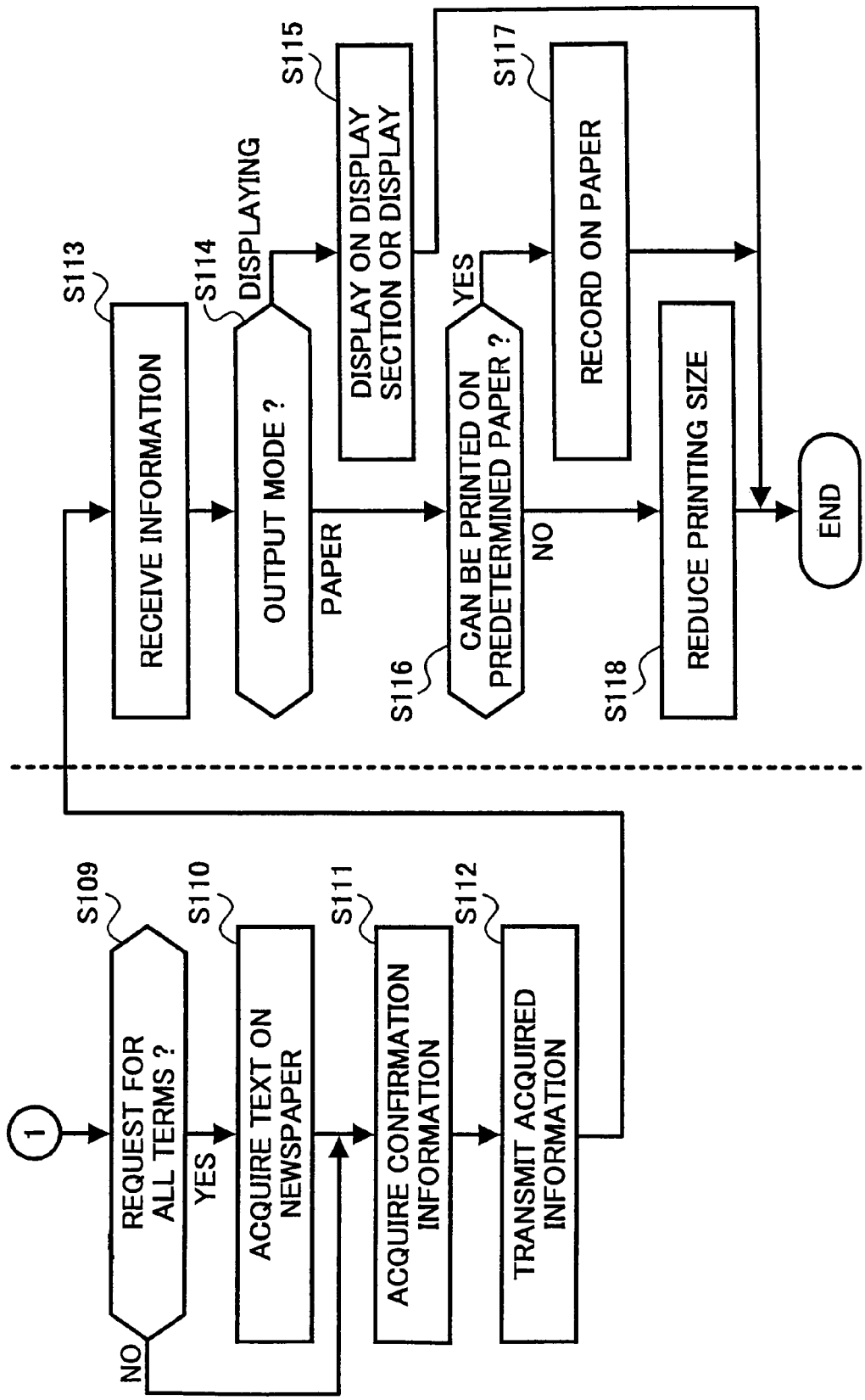

PUBLICATION CONFIRMING METHOD, PUBLICATION INFORMATION ACQUISITION APPARATUS, PUBLICATION INFORMATION PROVIDING APPARATUS AND DATABASE

BACKGROUND OF THE INVENTION

1. Field of the Invention

The present invention relates to a publication confirming method which estimates the date of issue of a publication, such as a newspaper, from contents of a part of the publication and provides information desired by a user and included in information appearing in the publication whose issuance date is estimated, and a publication information acquisition apparatus, publication information providing apparatus and database which accomplish the method.

2. Description of the Related Art

People well recognize newspapers available in the market as publications from which they can obtain various kinds of information. Some of subscribers of newspapers cut out those portions of newspapers in which information needed or interesting appears and file the clippings or scraps in scrapbooks or the like.

To ensure the reliability of matters written on such a newspaper scrap to be filed in a scrapbook or the like, it is important to clarify from which newspaper publishing company the newspaper was issued and the date of issue of the newspaper.

But it is not always the case that such a newspaper scrap filed in a scrapbook or the like is not cut out together with a portion which mentions the newspaper publishing company of the newspaper and the date of issue of the newspaper (normally, information at the topmost portion of a newspaper).

There may be a case where the name and the date of issue of a newspaper a piece of which is filed in a scrapbook or the like are handwritten in free space of the piece. Even in this case, the name and the date of issue of a newspaper may not always be handwritten. This often results in a lower reliability of newspaper scraps filed in a scrapbook or the like.

Newspaper scraps filed in a scrapbook or the like fade or become dirty with time. Even if such faded or dirty newspaper scraps filed in an original scrapbook are copied to create a new scrapbook, the copies obtained would not have a good image quality. This makes it insignificant to create the new scrapbook.

In view of this situation, some subscribers need to know the names and the dates of issue of newspapers pieces of which are filed in scrapbooks or the like. There may be some subscribers who need articles in newspapers which are specified by their names and issuance dates. Those people should acquire desired information by performing information retrieval. The following will describe some prior arts that relate to information retrieval.

Japanese Patent No. 2729356 proposes "an information retrieval method for extracting a topicality, with a computer process, from a database comprising a plurality of data elements each provided with time information and including information to which a keyword can be given, which method has a stage of determining a frequency of constant occurrence relating to a given keyword included in said data elements and defined as an estimated number of data elements given with time information in a unit time which includes said given keyword, constantly over a predetermined period of said time information; a stage of determining, as a start point of a topicality of said given keyword, a point at which a value obtained by subtracting said frequency of constant occurrence from the number of data elements given with time information in a unit time, which includes said given keyword, becomes maximum along an axis of said time information; a stage of determining, as an end point of said topicality of said given keyword, a point which is later than said start point of said topicality and at which the number of data elements given with time information in a unit time, which includes said given keyword, drops to a level of approximately said frequency of constant occurrence along an axis of said time information; a stage of providing a model beforehand as a function of a change in a frequency of topicality which monotonously decreases from said start point of said topicality to said end point of said topicality; a stage of determining a distance between said function given as said model beforehand and a graph of a change in said value obtained by subtracting said frequency of constant occurrence from the number of data elements given with time information for each unit time from said start point of said topicality to said end point of said topicality; and a stage of selecting said given keyword as a topic in response to a value of said distance relating to said given keyword being smaller than a certain threshold value".

That is, the prior art information retrieval method is a scheme for presenting a keyword which allows a user who does not have a sufficient knowledge about a field relating to a document to be retrieved to reach a meaningful document or a document which is full of topics.

Unexamined Japanese Patent Application KOKAI Publication No. 2000-20538 proposes "an information retrieval method for retrieving information included in a plurality of documents from a database including said documents and source data of each document, which method includes a document specifying step of specifying a document from said database based on said source data; a topic word extracting step of extracting, as a topic word, a word appearing a predetermined number of times or more from words included in said document specified by said document specifying step; a topic word group identifying step of identifying a group of topic words commonly included in one document or a plurality of documents as a topic word group constituting a single topic; a group combination extracting step of extracting those two topic word groups in said topic word groups which have a common topic word, as one group combination; and a two-dimensional display step of displaying said topic word groups included in said group combination in a two-dimensional coordinate system determined by a first axis and a second axis, said first axis of said two-dimensional coordinate system representing a single source data item included in said source data while said second axis of said two-dimensional coordinate system represents said topic words".

This prior art information retrieval method is designed to allow a user to easily take a general view of contents included in a database by presenting graphical display of the contents.

Unexamined Japanese Patent Application KOKAI Publication No. H10-289237 discloses a publication volume calculating apparatus which computes the publishing interval of publications using past history information of the publications and predicts the volume and the date of issue of the next publication to the recent publication. Further, Unexamined Japanese Patent Application KOKAI Publication No. H10-289237 discloses a technique of displaying the volumes of intervening publications based on the volumes of the first and last publications.

Unexamined Japanese Patent Application KOKAI Publication No. 2000-30145 discloses a newspaper output apparatus which extracts and outputs an article in a newspaper from the date of issue of the newspaper by referring to a database storing newspaper data.

Unexamined Japanese Patent Application KOKAI Publication No. 2001-76007 discloses a data managing method and system that store information which may be needed by a user in future on behalf of the user and provide the information when requested by the user as needed, and an apparatus which is used for the method and system.

Those prior arts however suffer the following problems.

(1) The technique disclosed in Japanese Patent No. 2729356 and the technique disclosed in Unexamined Japanese Patent Application KOKAI Publication No. 2000-20538 force a user to designate a keyword from contents of a scrap filed in a scrapbook or the like in order to search for newspaper information showing the publishing company and the date of issue of a newspaper to which the scrap belongs. Further, the user should decide whether the retrieved newspaper information is desired information or not. Those techniques are therefore troublesome and suffer a poor usability.

While the technique disclosed in Unexamined Japanese Patent Application KOKAI Publication No. H10-289237 can acquire information relating to the volume, it cannot acquire information on the date of issue or the publishing company of a newspaper a piece of which is filed in a scrapbook or the like.

Because the technique disclosed in Unexamined Japanese Patent Application KOKAI Publication No. 2000-30145 requires an entry of the date of issue of a newspaper, it is necessary to acquire the date of issue of a desired newspaper beforehand somehow.

SUMMARY OF THE INVENTION

Accordingly, it is an object of the invention to provide a publication confirming method, a publication information acquisition apparatus, a publication information providing apparatus and a database that can ensure easy and simple confirmation of information or the like indicating a part of which publication to which a scrap of a publication without the name and the date of issue of the publication belongs and when the publication was issued.

To achieve the object, according to one aspect of the invention, there is provided a publication confirming method for executing a process of acquiring partial information appearing in a part of a publication to be checked by a publication information acquisition apparatus used by a user of a service, converting the partial information into electronic information and transmitting the electronic information to a publication information providing apparatus which uses a database storing at least information appearing in publications; a process of decoding the electronic information by a predetermined processing method with the publication information providing apparatus, acquiring key information from the decoded electronic information, specifying the publication to be checked by searching information stored in the database, acquiring a name of the publication to be checked, a date of issue of the publication to be checked or both as confirmation information and transmitting the confirmation information to the publication information acquisition apparatus; and a process of outputting the confirmation information from the publication information acquisition apparatus.

The publication information acquisition apparatus may be capable of both recording the confirmation information on a sheet of paper and displaying the confirmation information on a display section as output modes and may output the confirmation information in an output mode selected by the user.

The publication confirming method may include a process of allowing the publication information acquisition apparatus to request the publication information providing apparatus to transmit information appearing in the publication to be checked in case where the user needs the information appearing in the publication to be checked; a process of allowing the publication information providing apparatus to acquire the information appearing in the publication to be checked from the database and transmit that information to the publication information acquisition apparatus; and a process of allowing the publication information acquisition apparatus to output the information appearing in the publication to be checked received from the publication information providing apparatus at least on a sheet of paper.

In this case, the process of requesting transmission of information appearing in the publication to be checked is executed at a time the electronic information may be transmitted to the publication information providing apparatus.

In case where recording in equal magnification on a sheet of paper of a predetermined size is not possible at a time of recording the confirmation information or the confirmation information and information appearing in the publication to be checked on the sheet of paper, the publication information acquisition apparatus may adequately select a scale-down process of scaling down the confirmation information or the confirmation information and information appearing in the publication to be checked and recording the scaled-down information on the sheet of paper or a double-side outputting process of continuously recording the confirmation information or the confirmation information and information appearing in the publication to be checked on top and back sides of the sheet of paper.

The key information may correspond to characters appearing in a part of the publication to be checked.

The key information may correspond to an image appearing in a part of the publication to be checked.

The key information may correspond to characters and an image appearing in a part of the publication to be checked.

To achieve the object, a publication information acquisition apparatus according to another aspect of the invention comprises a reading section which reads an image of a part of a publication set by a user; an image memory which stores the image; an electronic-information generating section which generates electronic information for transmission by performing a predetermined process on the stored image; a transmission section which transmits the electronic information to a publication information providing apparatus which specifies the publication; a reception section which receives a name of the publication, a date of issue of the publication or both as confirmation information when receiving the name of the publication, the date of issue of the publication or both as a result of transmission of the electronic information; a reception data memory which stores the confirmation information; and an output section which outputs the confirmation information stored in the reception data memory to present the user with the confirmation information.

The output section may comprise a printing section which outputs information on a sheet of paper and a display section which displays information and the confirmation information is output by the printing section or the display section selected by the user.

The publication information acquisition apparatus may further comprise a text requesting section which requests the publication information providing apparatus to transmit information appearing in the publication via the transmission section in case where the user requests the information appearing in the publication, the reception section may receive that information appearing in the publication which has been transmitted by the publication information providing apparatus as a result of the text requesting section having requested transmission of information appearing in the publication, and the information appearing in the publication may be output from the printing section.

At the time of transmitting the electronic information, the text requesting section may request the publication information providing apparatus to transmit information appearing in the publication.

In case where recording in equal magnification on a sheet of paper of a predetermined size is not possible at a time of recording the confirmation information or the confirmation information and information appearing in a text of the publication on the sheet of paper, the printing section may adequately select scaled-down recording of scaling down the confirmation information or the confirmation information and information appearing in said the publication and recording the scaled-down information on the sheet of paper or double-side recording of continuously recording the confirmation information or the confirmation information and information appearing in said publication on top and back sides of the sheet of paper.

To achieve the object, a publication information providing apparatus according to a further aspect of the invention comprises a reception section which receives electronic information indicating information included in an image of a part of a publication to be checked when the said electronic information is given from a publication information acquisition apparatus used by a user; a key-information generating section which generates key information for searching a database storing information for specifying a publication including information appearing in the publication by performing a predetermined process on the electronic information; a confirmation-information acquisition section which searches the database using the key information to specify a publication corresponding to the electronic information and acquire a name of said specified publication, a date of issue of said specified publication or both as confirmation information; and a transmission section which transmits the confirmation information to the publication information acquisition apparatus.

The publication information providing apparatus may further comprise an article information memory which stores information appearing in said specified publication, and when the confirmation-information acquisition section has specified the publication corresponding to the electronic information, the confirmation-information acquisition section may acquire a name of the specified publication, a date of issue of said specified publication or both as the confirmation information, may acquire information appearing in said specified publication from the database and may store the acquired information appearing in said specified publication in the article information memory, and the transmission section may transmit the information appearing in the publication that is stored in the article information memory to the publication information acquisition apparatus as needed.

The transmission section may transmit the information appearing in the publication that is stored in the article information memory to the publication information acquisition apparatus when requested by the publication information acquisition apparatus.

The transmission section may transmit the information appearing in the publication that is stored in the article information memory to the publication information acquisition apparatus when transmitting the confirmation information to the publication information acquisition apparatus.

The key information may correspond to characters appearing in a part of the publication to be checked.

The key information may correspond to an image appearing in a part of the publication to be checked.

The key information may correspond to characters and an image appearing in a part of the publication to be checked.

To achieve the object, a database according to a still further aspect of the invention comprises an input-output section which inputs and outputs information; and a storage section which stores name of publications, dates of issue of the publications and information appearing in the publications in association with one another, whereby when key information for searching is given via the input/output section, that publication in which same information as the key information appears is extracted from the storage section and a name of the extracted publication, a date of issue of the publication and information appearing in the publication which are stored are output from the input-output section.

The key information may correspond to characters appearing in a part of an arbitrary publication.

The key information may correspond to an image appearing in a part of an arbitrary publication.

The key information may correspond to characters and an image appearing in a part of an arbitrary publication.

BRIEF DESCRIPTION OF THE DRAWINGS

These objects and other objects and advantages of the present invention will become more apparent upon reading of the following detailed description and the accompanying drawings in which:

FIG. 4 is an explanatory diagram showing contents registered in a database;

FIG. 5 is a flowchart illustrating the publication confirming method; and

FIG. 6 is a flowchart illustrating a continuation of the publication confirming method.

DETAILED DESCRIPTION OF THE PREFERRED EMBODIMENTS

A preferred embodiment of the invention will now be described with reference to the accompanying drawings.

Figure 1:
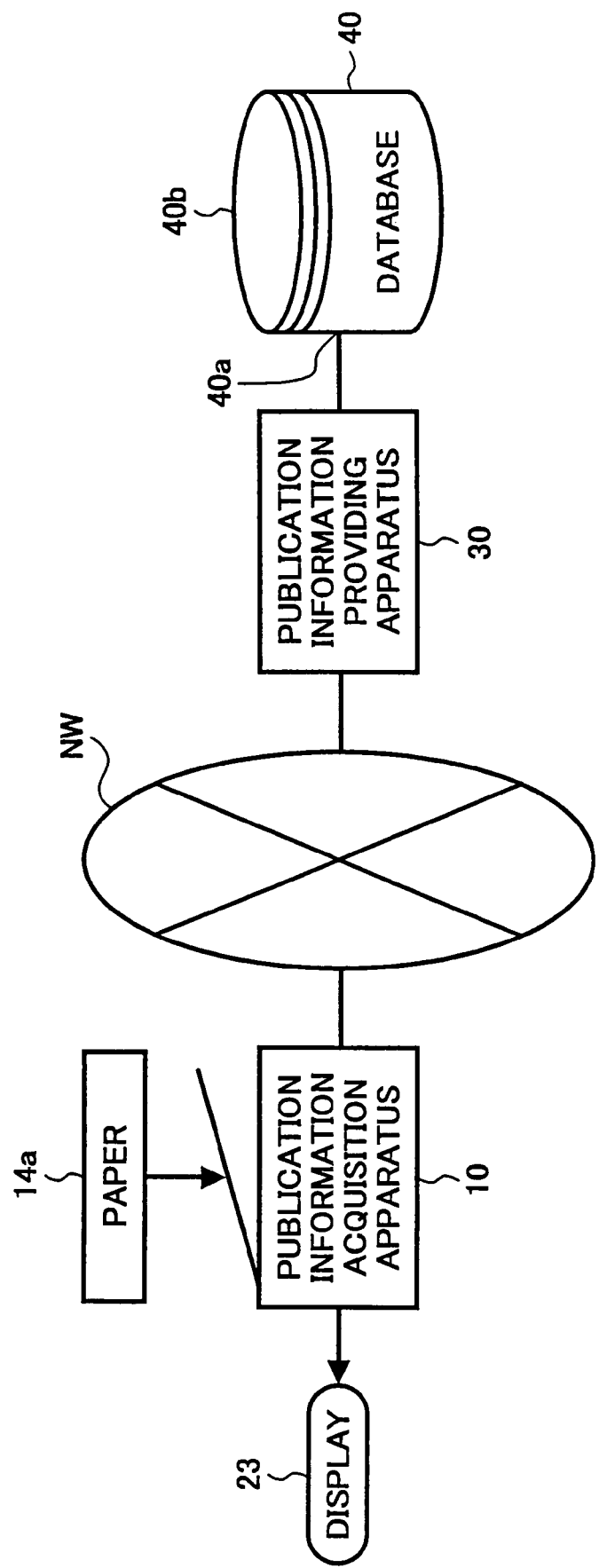
FIG. 1 is an explanatory diagram illustrating a publication information acquisition apparatus, a publication information providing apparatus and a database which execute a publication confirming method according to the invention.
Figure 2:
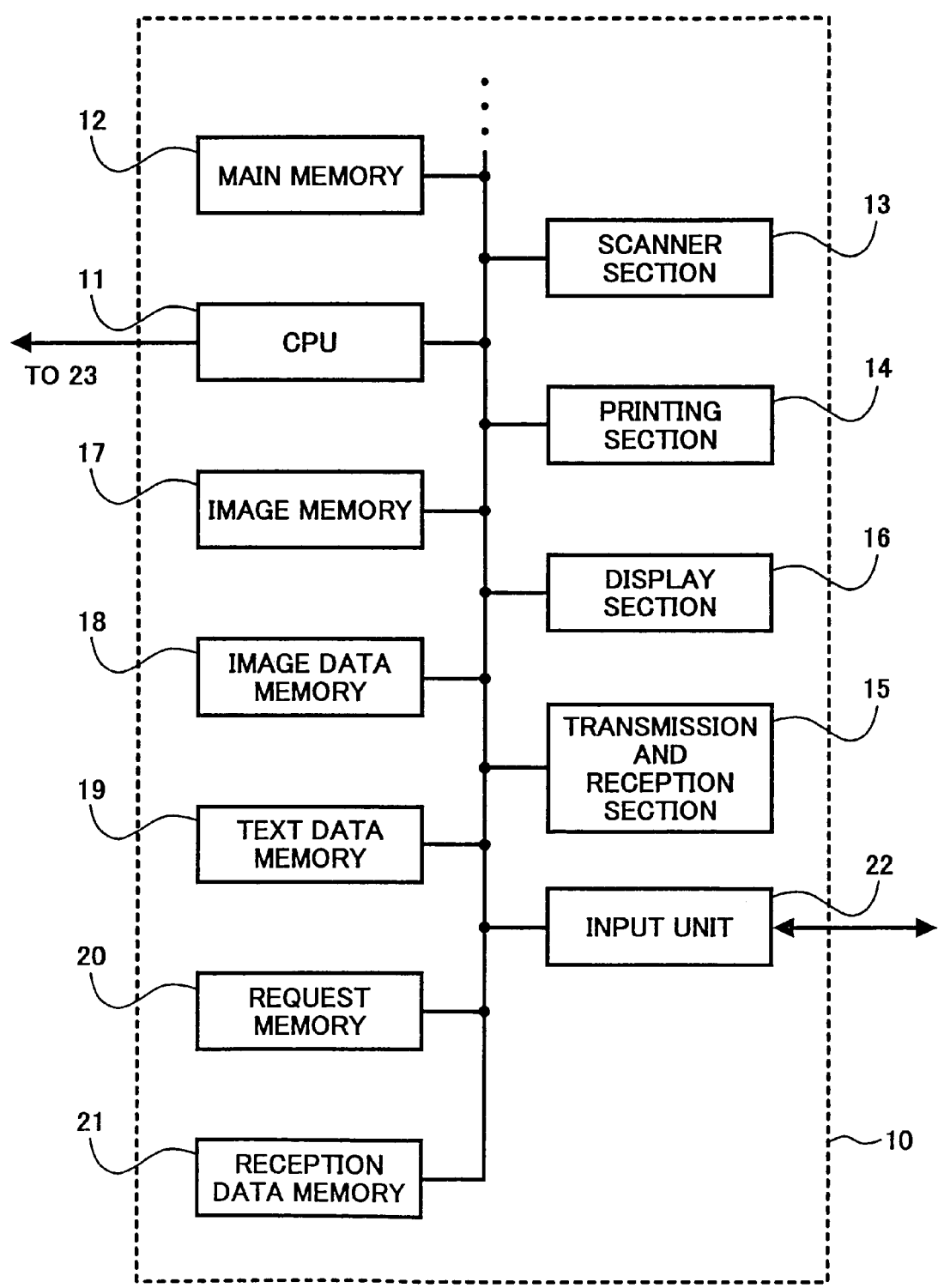
FIG. 2 is a structural diagram illustrating the publication information acquisition apparatus.
Figure 3:
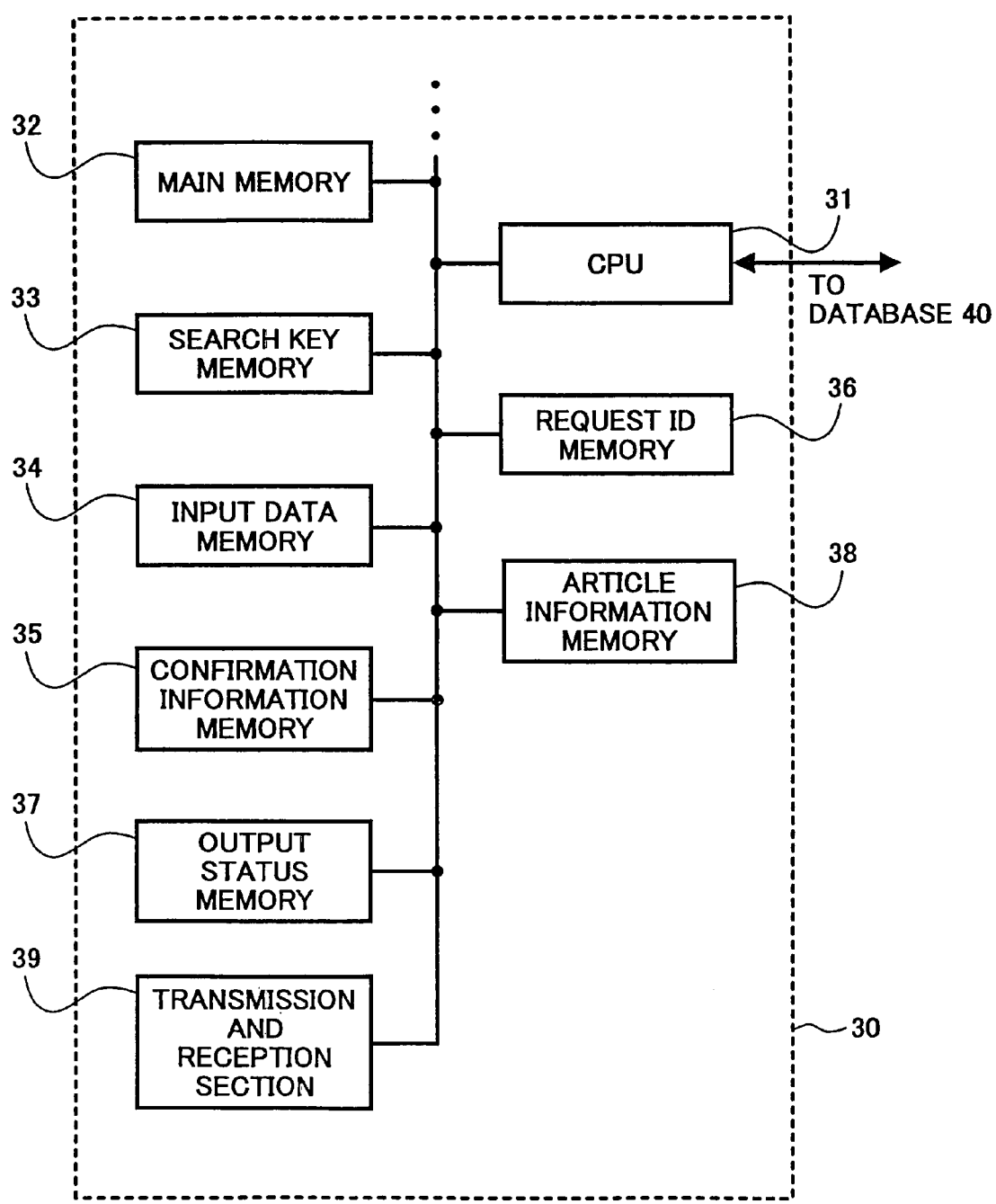
FIG. 3 is a structural diagram illustrating the publication information providing apparatus.

FIG. 1 is an explanatory diagram illustrating a publication information acquisition apparatus, a publication information providing apparatus and a database which execute a publication confirming method according to the invention.

A publication information acquisition apparatus 10 is used by a user who needs information about publications. The publication information acquisition apparatus 10 is connected to a publication information providing apparatus 30 via a network NW. A database 40 is connected to the publication information providing apparatus 30. The publication information providing apparatus 30 and the database 40 are set by a service provider who provides information on publications.

The publication information acquisition apparatus 10 is a so-called composite apparatus (multifunction apparatus) which accomplishes functions, such as a copy function, facsimile function, printer function and scanner function. The publication information acquisition apparatus 10 has a CPU (Central Processing Unit) 11, a main memory 12, a scanner section 13, a printing section 14, a transmission and reception section 15, a display section 16, a plurality of auxiliary memories 17 to 21 and an input unit 22 such as a keyboard.

The CPU 11 controls the general operation of the publication information acquisition apparatus 10 in accordance with a program stored in the main memory 12. The scanner section 13 scans and acquires an image given by a user. The printing section 14 prints data on a printing paper 14a set by the user. The transmission and reception section 15 transmits and receives various kinds of data. The display section 16 is provided for a monitoring purpose and provides a visual display of data.

Of the auxiliary memories, the image memory 17 temporarily stores an image acquired by the scanner section 13. The image data memory 18 stores electronic information to be transmitted to the publication information providing apparatus 30. The text data memory 19 stores text data to be transmitted to the publication information providing apparatus 30. The request ID memory 20 stores a request which is made every unit of requesting provision of information on a publication and an identifier which is assigned to the request. The reception data memory 21 stores information supplied from the publication information providing apparatus 30.

An external display 23 is connected to the publication information acquisition apparatus 10. The display 23 is connected to the CPU 11.

In the publication information acquisition apparatus 10, a piece of a newspaper without the name of newspaper and date of issue of the newspaper is set in the scanner section 13. The scanner section 13, which operates as a reading section, scans the image of the piece of the newspaper. The image is stored in the image memory 17. The CPU 11 functions as an electronic-information generating section and converts the image stored in the image memory 17 to electronic information to be transmitted to the publication information providing apparatus 30. Electronic information may be an image compressed. Alternatively, characters may be extracted from the image through a character recognition process, text data of those characters may be electronic information. The electronic information obtained by compressing the image is stored in the image data memory 18. The text data is stored in the text data memory 19. Hereinafter, those pieces of electronic information are called "index electronic information".

The CPU 11 prompts the user to input the contents of a request on, for example, via the display section 16. The user decides what he wants to know, the name of the newspaper from which the piece was cut out, the date of issue of the newspaper or both, and inputs the information from the input unit 22. The user also inputs whether or not to request information appearing in the text of the newspaper. Further, the user selects the output mode for the information acquired from the publication information providing apparatus 30 and inputs the output mode. That is, the user selects whether to display the information on the display section 16 or the display 23 or to print the information with the printing section 14. When the output mode cannot be selected, the user inputs data indicating no selection having been made through the input unit 22. The CPU 11 adds an identifier to the information input by the user as a request and stores the identifier-added information into the request ID memory 20.

At the stage where the user completes the entry of a request and the preparation of the index electronic information, the index electronic information and the request are transmitted to the publication information providing apparatus 30 via the transmission and reception section 15 and the network NW.

In case where an image is converted to text data before transmission, the conversion of the image to text data takes time, making it difficult to transmit the image immediately after being scanned, so that the text data may be set to be automatically transmitted later.

While the network NW may be a wire telephony or a radiotelephone, it is assumed to be the Internet via a telephone line for the sake of simplicity.

The publication information providing apparatus 30 comprises a CPU 31, a main memory 32, a search key memory 33, an input data memory 34, a confirmation information memory 35, a request ID memory 36, an output status memory 37, a article information memory 38 and a transmission and reception section 39.

The CPU 31 controls the general operation of the publication information providing apparatus 30 in accordance with a program stored in the main memory 32. The search key memory 33 stores key information for searching to be discussed later. The input data memory 34 stores index electronic information given from the publication information acquisition apparatus 10. The confirmation information memory 35 stores confirmation information to be discussed later. The request ID memory 36 stores the contents of a request given from the publication information acquisition apparatus 10. The output status memory 37 stores information indicating the performance of the publication information acquisition apparatus 10, such as the capacity, beforehand. The article information memory 38 stores information appearing in a publication which is read from a database 40.

The database 40 is constituted by a hard disk unit or a recording medium. The database 40 has a input-output section 40a and an storage section 40b which inputs and outputs information. Depending on the recording medium the input-output section 40a and the storage section 40b may substantially become identical. The storage section 40b transmits and receives data to and from the CPU 31.

The database 40 is storing information appearing in each newspaper in the form of text data or photographs, and other images on each newspaper in the form of image data. The database 40 is storing those pieces of data in association with the name of each newspaper and the date of issue thereof, as shown in FIG. 4.

When the publication information acquisition apparatus 10 sends index electronic information and a request to the publication information providing apparatus 30, the transmission and reception section 39 receives them. The request is stored in the request ID memory 36. The index electronic information is stored in the input data memory 34. In case where the index electronic information is image data, the CPU 31 decodes and converts the index electronic information into text data. The CPU 31 acquires a predetermined key word from the text data and stores the acquired key word in the search key memory 33.

When the index electronic information is text data, the CPU 31 acquires a key word directly from the text data and stores the key word in the search key memory 33. Using the key word stored in the search key memory 33, the CPU 31 searches the database 40 for the newspaper which contains information appearing in the piece that was cut out from the newspaper.

In case where the index electronic information indicates information on both characters and an image, the CPU 31 may separate the index electronic information into index electronic information indicating the characters and index electronic information indicating the image. In this case, the CPU 31 may execute the search based on the index electronic information indicating the characters, the index electronic information indicating the image or both index electronic information.

The flow of the publication confirming method according to the embodiment will be described below.

A user who receives a service causes the scanner section 13 of the publication information acquisition apparatus 10 to scan a piece of a newspaper which has no name or date of issue described thereon (step S101). The CPU 11 of the publication information acquisition apparatus 10 stores an image read by the scanner section 13 in the main memory 12 temporarily.

At this time, the user selectively input through the input unit 22 whether to output the search results on a sheet of paper 14a or to display the results on the display 23 or the display section 16, when the search results will be supplied to the publication information acquisition apparatus 10 later. The user selects information to be searched by the publication information providing apparatus 30. Specifically, using the input unit 22 the user selects whether to find out the name of a newspaper, the date of issue or both. This becomes a request. The user also makes an input on whether or not to acquire information appearing in the text of a newspaper scanned by the scanner section 13, as a request (step S102). The CPU 11 stores the requests in the request ID memory 20.

The CPU 11 generates index electronic information from the image stored in the main memory 12. The index electronic information is stored in the image data memory 18 or the text data memory 19. Then, the CPU 11 transmits the requests entered by the user and the index electronic information to the publication information providing apparatus 30 from the transmission and reception section 15 via the network NW (step S103).

When the publication information acquisition apparatus 10 sends the index electronic information and requests to the publication information providing apparatus 30, the transmission and reception section 39 receives them (step S104). The CPU 31 of the publication information providing apparatus 30 stores the index electronic information in the input data memory 34 and stores the requests in the request ID memory 36. The CPU 31 analyzes the index electronic information stored in the input data memory 34 (step S105). In case where the index electronic information indicating is image data, the CPU 31 performs, for example, a character recognition process having predetermined rules on the image data to recognize characters and convert the index electronic information into character codes.

From the index electronic information converted to the character codes in the character recognition process or the index electronic information that has already been converted to text data by the publication information acquisition apparatus 10, the CPU 31 specifies, for example, character codes of text data corresponding to a headline as a key word in the search key memory 33. Or the CPU 31 specifies, character codes of a predetermined number of characters from the top of the text data. The CPU 31 stores the specified character codes as a key word in the search key memory 33. In case where the index electronic information includes information on characters and information on an image, the CPU 31 separates the characters from the image, prior to the character recognition process, the CPU 31 performs the separation and uses index electronic information equivalent to the information on the image as a key word (step S106).

Based on the key word stored in the search key memory 33, the CPU 31 refers to the database 40 storing information, such as information of the text appearing in a newspaper, the name of the newspaper and the date of issue of the newspaper to specify the newspaper that matches with the newspaper from which the piece whose image has been scanned by the scanner section 13 (step S107). Because normally there a plurality of newspapers to be specified, not one, the CPU 31 extracts the search results as likely candidates to be selected, stores information of the texts of the candidate newspapers in the article information memory 38 and checks if those pieces of information completely match with the information included in the index electronic information actually received (step108).

When the transmitted index electronic information is the text data, it is checked if the text data obtained completely matches with the text data of the text of each newspaper stored in the database 40.

When the transmitted index electronic information is image data and the character recognition process is performed on the image data, it is checked if the text data obtained by the character recognition process completely matches with the text data of the text of each newspaper stored in the database 40. When the transmitted index electronic information includes characters and an image and index electronic information indicating the image that is separated through the character recognition process performed is used as a key word, it may be checked if electronic data indicating the image fully matches with the image data of the information appearing in the text of the newspaper.

Such a character recognition process is performed on all the candidates to specify the text of the newspaper that has a complete match. In case where there is no fully matched text in the database 40, the CPU 31 specifies the text of a newspaper which appears to be a most likely match based on the matching ratio and treats the text as the most likely candidate.

In this case, the most likely candidate differs from the fully matched text, at the time of transmitting confirmation information to be discussed later to the user via the publication information acquisition apparatus 10, data indicating the candidate is a likely candidate is added to the confirmation information so that the text being not the fully matched text can be displayed.

Next, based on the requests stored in the request ID memory 36, the publication information providing apparatus 30 checks the mode (type) of information the user wants to obtain to confirm if what is transmitted is the entire text of an article on a newspaper, the name and the date of issue of the newspaper, the name of the newspaper or the date of issue of the newspaper alone (step S109).

When the confirmation in step S109 results in the transmission of information of the text of the newspaper, the CPU 31 searches and acquirs the name and the date of issue of the newspaper the contents of whose text coincide with the contents of the index electronic information from the database 40. The name of the newspaper or the date of issue of the newspaper based on the requests, and the acquired information is added as confirmation information to the information of the text of the newspaper. The CPU 31 transmits the confirmation information and the information of the text of the newspaper to the publication information acquisition apparatus 10 via the transmission and reception section 39 and the network NW (step S112).

When only the name of the newspaper or the date of issue of the newspaper, not information of the entire text of the newspaper, is requested in step S109, the name of the newspaper whose text has had a match in the search, the date of issue of that newspaper or both are acquired from the database 40 as confirmation information without extracting article data, and the confirmation information is transmitted to the publication information acquisition apparatus 10 (step S112).

In case of transmitting both information of the text of a newspaper and confirmation information, when plural pieces of index electronic information are transmitted from the publication information acquisition apparatus 10, information of the texts of the newspapers that correspond to the individual pieces of index electronic information and confirmation information are grouped into a single data group, and the single data group is transmitted to the publication information acquisition apparatus 10 via the network NW. In this case, confirmation information for a newspaper to be transmitted is adequately adjusted in accordance with the performances of the memories of the publication information acquisition apparatus 10 that temporarily store the confirmation information or the like and the performance of the CPU of the publication information acquisition apparatus 10. When the publication information acquisition apparatus 10 has a low performance, for example, information to be transmitted to the publication information acquisition apparatus 10 is divided into segments which are then transmitted in separate transmissions.

Such adjustment of information to be transmitted is carried out based on the performance information of devices that have been acquired and registered in the output status memory 37 beforehand. The adjustment may be executed when the publication information acquisition apparatus 10 transmits the performance information of the devices, the index electronic information and requests. Even if the publication information acquisition apparatus 10 has a high performance, information to be transmitted may be sent as a plurality of files in accordance with the demand by the user.

When the publication information providing apparatus 30 transmits the confirmation information or the confirmation information and the information of the text of the newspaper to the publication information acquisition apparatus 10, the transmission and reception section 15 receives those information (step S113).

The CPU 11 of the publication information acquisition apparatus 10 stores the received information in the reception data memory 21. The CPU 11 determines the output mode for the confirmation information by decoding the requests stored in the request ID memory 20 or the output mode information added to the confirmation information. That is, the CPU 11 discriminates whether to output the confirmation information on a sheet of paper or display the confirmation information on the display panel (step S114).

When the output mode is not preset at the time of requesting a service, a predetermined default type preset in the publication information acquisition apparatus 10 may be set as a temporary output mode. The temporary output mode may be a mode to print the confirmation information 100% on one side of a sheet of paper of size A4. Alternately, the confirmation information may be temporarily saved in a memory or the like in the publication information acquisition apparatus 10 as a temporary file without providing an output on paper or panel display. In this case, the user of the publication information acquisition apparatus 10 checks the temporarily stored confirmation information after reception and selects the output mode, either the display mode or the print-out mode, according to the preference of the user.

When the output mode is the panel display mode in step S114, the publication information acquisition apparatus 10 displays the received confirmation information on the display section 16 or the external display 23 and terminates the process (step S115).

In case where only the date of issue is displayed, for example, viewing what is displayed on the display section 16 or the display 23, the user may handwrite the date of issue on the piece of the newspaper scrapped by the user and transmitted after scanning by the scanner section 13. The user may set that piece of the newspaper in a predetermined printing frame and directly print the date of issue on the piece.

When the output mode is the printing on paper in step S114, the publication information acquisition apparatus 10 checks if the printing section 14 can properly print the received confirmation information and the information of the text of the newspaper on the set sheet of paper. That is, in case where the printing paper 14a has the size A4, for example, the publication information acquisition apparatus 10 checks if a sheet of paper of the size A4 is set in the printing section 14. Even if the printing paper 14a of the size A4 is set in the printing section 14, the publication information acquisition apparatus 10 determines whether or not the confirmation information and the information of the text of the newspaper can be output on the sheet of paper of the size A4 in equal magnification to thereby check if those information can be output from the printing section 14 (step S116).

When the output is possible, the publication information acquisition apparatus 10 provides the printing section 14 with the received confirmation information and information of the text of the newspaper and prints those information on, for example, a sheet of paper of the size A4 and then terminates the process (step S117).

When the output on a designated sheet of paper is not possible, i.e., when the confirmation information and the information of the text of the newspaper cannot be completely output on one side of a sheet of paper of the size A4, for example, the confirmation information and the information of the text of the newspaper are subjected to a publication of selecting the proper character font or scale down the entire information in view of the amount of those information to ensure the complete output of the information on a predetermined sheet of paper and the resultant information is transferred to the printing section 14. As a result, the printing section 14 records the confirmation information and the information of the text of the newspaper on the predetermined sheet of paper, then terminates the process (step S118).

In this case, newspaper confirmation information may be divided into a plurality of segments which are in turn recorded on plural sheets of paper or on both sides of a sheet of paper. The user may set the recording/output mode, such as segmented outputting or outputting on both sides of a sheet of paper, beforehand so that the received information may be output in the set output mode. This design can allow the redundancy of output information to be adequately absorbed in the recording process when the same information as the information of a piece transmitted is output on a sheet of paper.

In case where the text of a newspaper which does not fully match with the scrap designated by the user is not found in the database 40, the publication information providing apparatus 30 adds a most likely candidate to confirmation information and transmits the resultant information to the publication information acquisition apparatus 10 as mentioned earlier. When the confirmation information added with the most likely candidate is transmitted to the publication information acquisition apparatus 10, the apparatus 10 provides an output indicating that the text is not a fully matched text at the time of displaying the confirmation information or outputting the confirmation information on a sheet of paper.

The following will describe the advantages of the embodiment.

(1) The publication information acquisition apparatus 10 that is used by the user converts the contents of a piece of a newspaper to index electronic information, and transmits the index electronic information to the publication information providing apparatus 30 via the network NW. The publication information providing apparatus 30 receives the index electronic information, decodes the index electronic information by a predetermined process, acquires key information for obtaining confirmation information from the index electronic information, searches information of newspapers in the database 40 based on the key information to acquire confirmation information, and transmits the acquired newspaper confirmation information to the publication information acquisition apparatus 10.

It is therefore possible to easily and simply check to which newspaper a piece of a newspaper having no name or issuance date described thereon belongs and when the newspaper was issued.

(2) According to the embodiment, the publication information acquisition apparatus 10 can select the output mode for confirmation information between a mode of recording the confirmation information on a sheet of paper and a mode of displaying the confirmation information on the display section 16 or the like, and outputs the received confirmation information in the selected output mode.

It is therefore possible to output newspaper confirmation information, such as the newspaper's name and the date of issue, in accordance with the use mode of the service user, thereby improving the usability.

(3) According to the embodiment, when the publication information acquisition apparatus 10 makes a request for information on the text of a newspaper at the time of transmitting index electronic information. The publication information providing apparatus 30 transmits the name of the newspaper, the date of issue or both together with information of the text as confirmation information for the newspaper and the publication information acquisition apparatus 10 records the received information of the text of the newspaper at least on a sheet of paper.

It is therefore possible to simply and easily acquire information of the text of a newspaper to which information on the name and/or the date of issue thereof are added and easily create a scrapbook or the like having an excellent image quality. This can lead to a further improvement on the usability.

(4) According to the embodiment, in case where recording in equal magnification on the printing paper 14a of a predetermined size is not possible at the time of recording confirmation information or the confirmation information and information of the text of a newspaper on the printing paper 14a, the publication information acquisition apparatus 10 adequately selects the scale-down process of scaling down those pieces of information, and recording the scaled-down information on the printing paper 14a, or the double-side outputting process of continuously recording the confirmation information, or the confirmation information and information of the text of the newspaper on both the top and back sides of the printing paper 14a.

It is therefore possible to record confirmation information and/or information of the text of a newspaper in accordance with the use mode for the confirmation information and the information of the text of the newspaper. In addition, it is possible to easily create a scrapbook of the standard size or a large scrapbook by adequately selecting the recording mode. This makes it possible to further improve the usability.

The invention is not limited to the above-described embodiment, but may be adapted to various applications and modified in various other forms, some of which will be discussed below.

(i) In case where a text corresponding to information described on a piece of a newspaper is not found in the database 40, a most likely candidate is presented and data which indicates that the candidate does not completely match with the text is output. However, this scheme is not restrictive. For example, data indicating that the presence of no matched item may be displayed or output through the setting operation of the publication information acquisition apparatus 10. In this case, the default setting may be designed to output a most likely candidate and output data indicating that the candidate does not completely match with the text and an optional setting may permit the output of data indicating that there is no matched item. This design would not raise a problem even if the user did not perform the setting operation.

(ii) An additional optional function may be provided to select whether or not to transmit a most likely candidate as per the embodiment in case where information appearing in a piece of a newspaper scanned by the scanner section 13 does not cover the entire text of an article in the newspaper. Another optional function may be provided to select one of various patterns, such as a pattern of executing a process of selecting one of plural pieces of information of the text of a newspaper corresponding to information appearing in the piece of the newspaper, if such is a case, based on the amount of description of the article, a pattern of outputting both articles, and a pattern of outputting data indicating that there is no matched item.

(iii) By using the function of the publication information providing apparatus 30 to store and file information appearing in a piece scanned by the scanner section 13 (the date of issue may or may not be present in this case) over a predetermined period of time, a scrapbook may be created for each user within the period, may be bound and may be provided in this form to the associated user.

(iv) An article on a piece scanned by the scanner section 13 may contain a photograph or the like, so that the publication information providing apparatus 30 may provide a service user with only the photograph portion as a real photograph or electronic data. That is, when the service provider that has provided the publication information providing apparatus 30 is a newspaper publishing company, photographs are generally filed as negatives and it is possible to specify the data of the article in which a photograph of interest is used. Because a photograph and electronic data can be provided from the negative of the photograph used in an article on a piece of a newspaper, the user can be provided with the photograph and electronic data.

(v) Although the publication information acquisition apparatus 10 is equipped with the six auxiliary memories 17 to 21, those of the memories which can be used commonly may be shared. Likewise, those of the memories of the publication information providing apparatus 30 which can be used commonly may be shared.

(vi) Although the embodiment is designed in such a way that when information of the text of a newspaper has been requested beforehand as a request, the information of the text of the newspaper is output, a user may be allowed to request the information of the text of the newspaper depending on the results of displaying confirmation information on the display section 16 or the display 23. In this case, at the time the publication information providing apparatus 30 acquires confirmation information from the database 40, the apparatus 30 can obtain the information of the text of the newspaper together and store the information in the article information memory 38 for a predetermined period of time, so that the apparatus 30 can transmit the information of the text to the publication information acquisition apparatus 10 when requested. As requests to which identifies stored in the request ID memories 20 and 36 are saved over a predetermined period of time, the requests can be input without requiring the troublesome operation by the user.

(vii) Although it is a piece of a newspaper that is to be checked according to the embodiment, another type of publication may be checked as well.

The apparatus of the present invention can be realized by a general computer, without the need for a dedicated system. A program and data for controlling a computer to execute the above-described processes may be recorded on a medium (a floppy disk, CD-ROM, DVD or the like) and distributed, and the program may be installed into the computer and run on an OS (Operating System) to execute the above-described processes, thereby achieving the apparatus of the present invention. The above program and data may be stored in a disk device or the like in the server device on the Internet, and embedded in a carrier wave. The program and data embedded in the carrier wave may be downloaded into the computer so as to realize the apparatus of the present invention.

Various embodiments and changes may be made thereonto without departing from the broad spirit and scope of the invention. The above-described embodiment is intended to illustrate the present invention, not to limit the scope of the present invention. The scope of the present invention is shown by the attached claims rather than the embodiment. Various modifications made within the meaning of an equivalent of the claims of the invention and within the claims are to be regarded to be in the scope of the present invention.

This application is based on Japanese Patent Application No. 2001-146759 filed on May 16, 2001, and including specification, claims, drawings and summary. The disclosure of the above Japanese Patent Application is incorporated herein by reference in its entirety.

What is claimed is:

1. A publication confirming method for executing:

a process of acquiring partial information appearing in a part of a publication to be checked by a publication information acquisition apparatus used by a user of a service, converting said partial information into electronic information and transmitting said electronic information to a publication information providing apparatus which uses a database storing at least information appearing in publications;

a process of decoding said electronic information by a predetermined processing method with said publication information providing apparatus, acquiring key information from said decoded electronic information, specifying said publication to be checked by searching information stored in said database, acquiring a name of said publication to be checked, a date of issue of said publication to be checked or both as confirmation information and transmitting said confirmation information to said publication information acquisition apparatus; and a process of outputting said confirmation information from said publication information acquisition apparatus, wherein said publication information acquisition apparatus is capable of both recording said confirmation information on a sheet of paper and displaying said confirmation information on a display section as output modes and outputs said confirmation information in an output mode selected by said user, and wherein in case where recording in equal magnification on a sheet of paper of a predetermined size is not possible at a time of recording said confirmation information or said confirmation information and information appearing in said publication to be checked on said sheet of paper, said publication information acquisition apparatus adequately selects a scale-down process of scaling down said confirmation information or said confirmation information and information appearing in said publication to be checked and recording said scaled-down information on said sheet of paper or a double-side outputting process of continuously recording said confirmation information or said confirmation information and information appearing in said publication to be checked on top and back sides of said sheet of paper.

2. The publication confirming method according to claim 1, wherein said key information corresponds to characters appearing in a part of said publication to be checked.

3. The publication confirming method according to claim 1, wherein said key information corresponds to an image appearing in a part of said publication to be checked.

4. The publication confirming method according to claim 1, wherein said key information corresponds to characters and an image appearing in a part of said publication to be checked.

* * * * *